United States Patent Office 3,050,558
Patented Aug. 21, 1962

3,050,558
REFINING OF DEMETHYLCHLOR-
TETRACYCLINE
Leland Leroy Smith, New City, Theodore Foell, Jr., Orangeburg, and Harold Mendelsohn, Nanuet, N.Y., assignors to American Cyanamid Company, New York, N.Y., a corporation of Maine
No Drawing. Filed Dec. 9, 1959, Ser. No. 858,332
6 Claims. (Cl. 260—559)

This invention relates to the refining of demethylchlortetracycline and more particularly is concerned with an improved process of extracting demethylchlortetracycline from fermentation mashes containing the same.

The demethyltetracyclines, demethyltetracycline itself, and demethylchlortetracycline (7-chloro-6-demethyltetracycline) are members of a new family of tetracycline antibiotics which are described and claimed in United States Patent to Jerry Robert Daniel McCormick et al. No. 2,878,289. The demethyltetracyclines therein described are produced by certain mutant strains of *Streptomyces aureofaciens* derived from the chlortetracycline-producing S. *aureofaciens* A–377 soil isolate described in United States Patent to Duggar No. 2,482,055 and deposited at the Northern Regional Research Laboratory, Peoria, Illinois, as NRRL 2209. The new demethyltetracycline-producing strains were derived by treatment of A–377 with mutagenic agents. Cultures of the new demethyltetracycline-producing strains of S. *aureofaciens* are on deposit at the American Type Culture Collection, Washington, D.C., under ATCC accession numbers 12551, 12552, 12553 and 12554.

Demethylchlortetracycline, as compared to the well-known broad-spectrum antibiotic tetracycline, singularly achieves far greater antibiotic activity against susceptible organisms with far less drug; it has remarkably greater stability in body fluids; and it has enhanced resistance to degradation and a low rate of renal clearance, all supporting high levels of antibiotic activity for extended periods.

Considerable difficulty has been experienced in developing a commercially practicable refining process for the recovery of demethylchlortetracycline from the fermentation mash. It might be supposed because of the structural similarities between chlortetracycline and demethylchlortetracycline that the purification procedures that were satisfactory for the refining of chlortetracycline would also be satisfactory for the refining of demethylchlortetracycline. Contrary to expectations, however, this has not proven to be the case. When attempts are made to recover demethylchlortetracycline by one of the better procedures developed for the recovery of chlortetracycline, e.g., the procedure described in the Pidacks Patent No. 2,655,535, which involves the extraction of chlortetracycline from the fermentation mash with n-butanol at a pH of about 1.5, followed by concentration of the butanol extract and recovery of the chlortetracycline as an acid salt, it has been found that very poor yields of about 35% of impure demethylchlortetracycline are obtained. Apparently, this is because in recovering demethylchlortetracycline from the acid butanol extract there is considerable degradation of the demethylchlortetracycline and formation of highly colored impurities which are recovered along with the demethylchlortetracycline. Consequently, the Pidacks et al. process cannot be used satisfactorily for the refining of demethylchlortetracycline.

The present invention is concerned with an improved process of extracting demethylchlortetracycline from the fermentation mash which comprises filtering the mash at an acid pH whereby the demethylchlortetracycline is contained in the aqueous filtrate, adjusting the calcium ion content of the aqueous filtrate to a predetermined level, mixing therewith a suitable quantity of a long-chain quaternary ammonium compound, such as cetyltrimethylammonium chloride, also mixing therewith a methyl alkyl ketone solvent, e.g., methyl isobutyl ketone, and adjusting the pH of this mixture to a pH of between 8 and 12 by the addition of alkali whereupon the demethylchlortetracycline is extracted into the organic solvent phase. The organic solvent phase containing the antibiotic is then separated from the aqueous phase containing the fermentation impurities and the antibiotic may be isolated from the solvent phase in any convenient manner as outlined more fully below.

The present invention is preferably carried out by first acidifying the mash to solubilize the antibiotics contained therein. Usually small quantities of chlortetracycline are produced biosynthetically by the new mutant strain of S. *aureofaciens* along with small quantities of demethyltetracycline and the desired demethylchlortetracycline. The mash is acidified to a pH of about 0.5 to 2.5, and preferably to a pH of about 0.8 to 1.5 with any strong mineral acid such as sulfuric acid, hydrochloric acid, phosphoric acid or the like. The acidified mash is filtered to remove the solubilized demethylchlortetracycline and any chlortetracycline and demethyltetracycline that may be contained therein. Usually a portion of the antibiotic is left in the filter cake and this may be recovered by extracting the filter cake with acidified water at a pH of about 1. Impurities and undissolved mash materials are again removed by filtration and this secondary filtrate is added to the primary filtrate to form a combined acid filtrate. This combined acid filtrate is then treated with oxalic acid or ammonium oxalate in the proportion of about 0.5% to 3.0%, based on the volume of the mash used, in order to remove excess calcium and/or magnesium ions present.

The matter of the removal of excess calcium ions is a factor of considerable importance. It is not possible to extract demethylchlortetracycline into the organic solvent if calcium ions are absent. However, if too much calcium is present a heavy precipitate of the calcium salt of demethylchlortetracycline forms during the extraction step and is not dissolved by the organic solvent. By proper adjustment of the calcium ions by the use of oxalic acid in the proportions specified above, however, a complex of calcium ions, demethylchlortetracycline and quaternary ammonium compound is formed which is readily extracted into the organic solvent phase. It is desirable to add the oxalic acid or salt thereof after the acid filtration step rather than before acid filtration because less quantities are needed for the decalcification of the acid filtrate than are required to decalcify the harvest mash.

After the precipitation of the requisite quantity of calcium and magnesium ions, the metal oxalates which are formed are removed by filtration. To the decalcified acid filtrate is added a suitable quantity of an alkyltrimethylammonium chloride or a dialkyldimethylammonium chloride. In general, the amount of quaternary ammonium compound may range from about 0.5 mole of quaternary ammonium compound per mole of demethylchlortetracycline to about 3 moles of quaternary ammonium compound per mole of demethylchlortetracycline. To the mixture of acid filtrate, oxalic acid and quaternary ammonium compound is added a suitable amount of a relatively inert, stable, water-immiscible organic solvent having a boiling point ranging from about 60° C. to 150° C. and a water-to-solvent antibiotic distribution ratio of at least 1 to 5 in favor of the organic solvent. We have found that the methyl alkyl ketones are outstandingly effective as solvents in this process. The quantity of methyl alkyl ketone solvent that is used ranges from about 5% to about 50% of the volume of the filtrate. Suitable methyl alkyl ketones which may be used in this process are methyl butyl ketone, methyl propyl ketone, methyl isobutyl ketone and methyl amyl ketone. Methyl isobutyl ketone is the solvent of choice since it seems to function particularly well in extracting the demethylchlortetracycline from the aqueous filtrate.

The mixture of acid filtrate, oxalic acid, quaternary ammonium compound and methyl alkyl ketone solvent is stirred and the pH is adjusted to a pH of between 8 and 12 and preferably to about 9–10 by the addition of a 50% solution of sodium hydroxide or ammonium hydroxide. Ammonium hydroxide is the base of choice in this step as there is an increase in recovery of the demethylchlortetracycline of about 5% as compared to the use of sodium hydroxide. Moreover, the color of the demethylchlortetracycline is also improved considerably. After the addition of ammonium hydroxide, stirring is continued for 30 minutes or so and the mixture is then subjected to phase separation such as a centrifuge which will separate the insoluble materials phase, the organic solvent phase and the aqueous phase. The insoluble materials phase and the aqueous phase are discarded and the demethylchlortetracycline is isolated from the organic phase as outlined more fully below.

We have found that the quaternary ammonium compounds known as the Arquads are particularly effective carriers for the hereinbefore described solvent extraction process. As indicated, these compounds are alkyltrimethylammonium chlorides or dialkyldimethylammonium chlorides and may be represented by the formula $R-N^+(CH_3)_3Cl^-$ or $R,R'-N^+(CH_3)_2Cl^-$, wherein R is a long chain group having at least 8 carbon atoms and R' may be an alkyl group having from 2–20 carbon atoms. A variety of compounds of this class are available varying as to length and number of long chain alkyl groups attached to the nitrogen atom. Listed below are some representative Arquads which are available commercially and which may be advantageously used in carrying out the present invention.

| Substituted Groups | Carbon Chain Length | Arquad Compounds | | | | | | |
|---|---|---|---|---|---|---|---|---|
| | | 2C,[1] Percent | 2HT,[1] Percent | C, Percent | S, Percent | 12, Percent | 16, Percent | 18, Percent |
| Octyl | 8 | 8 | | 8 | | | | |
| Decyl | 10 | 9 | | 9 | | | | |
| Dodecyl | 12 | 47 | | 47 | | 90 | | |
| Tetradecyl | 14 | 18 | | 18 | | 9 | | |
| Hexadecyl | 16 | 8 | 30 | 8 | 10 | | 90 | 6 |
| Octadecyl | 18 | 10 | 70 | 5 | 10 | | 6 | 93 |
| Octadecenyl | 18 | | | 5 | 35 | 1 | 4 | 1 |
| Octadecadienyl | 18 | | | | 45 | | | |

[1] Arquad 2C and Arquad HT are dialkyldimethylammonium chlorides. All others are alkyltrimethylammonium chlorides.

The Arquad compound that we prefer to use and with which we have obtained the best results is Arquad 16 which is understood to be a long chain alkyltrimethylammonium chloride in which the alkyl groups consist of 90% hexadecyl, 6% octadecyl and 4% octadecenyl. Essentially this is cetyltrimethyl-ammonium chloride. This compound is particularly preferred because of its low cost and the fact that it seems to be especially selective in giving purer demethylchlortetracycline.

Following the described extraction process, the demethylchlortetracycline may be recovered from the solvent extract in a number of ways. A preferred method is the recovery of the demethylchlortetracycline as a mineral acid salt, e.g., the hydrochloride. This may be accomplished by adding to the methyl alkyl ketone solvent extract a suitable quantity of water, usually about 10% by volume of the extract volume. The mixture is then acidified with concentrated hydrochloric acid to a pH of about 1.5 to 2.5 (at pH 0.5 demethylchlortetracycline hydrochloride crystallizes). The organic solvent phase and the aqueous phase are mixed by agitation, then separated. The acid salt of demethylchlortetracycline is now contained in the aqueous phase which is treated with salt, preferably sodium chloride, contacted with a lower alkanol, such as n-butanol, and the butanol extract is then concentrated. A lower alkoxy lower alkanol, such as 2-ethoxyethanol is then added, the pH is adjusted to 1.0 with concentrated hydrochloric acid, and the mixture is seeded and aged to effect crystallization of the demethylchlortetracycline. The demethylchlortetracycline hydrochloride crystals present are collected by filtration, washed with a mixture of a lower alkanol and a lower alkoxy lower alkanol and finally vacuum-dried.

The isolation procedure described above may be simplified if the original fermentation mash potency is sufficiently high. If the concentration of demethylchlortetracycline exceeds 500 micrograms per milliliter the following procedure is preferred: The solvent extract is mixed with a volume of water equal to 4% to 10% of the solvent extract volume. The two-phase system is acidified with concentrated hydrochloric acid until the pH of the aqueous phase is about 0.5. The hydrochloride of the demethylchlortetracycline crystallizes and is recovered by filtration.

A particularly preferred isolation procedure involves the isolation of demethylchlortetracycline urea sulfate by adding about 5% of a saturated aqueous urea solution to the methyl isobutyl ketone extract of demethylchlortetracycline. This solution is then adjusted to a pH of about 1 with concentrated sulfuric acid whereupon a demethylchlortetracycline-urea sulfate complex precipitates. Pure demethylchlortetracycline can then be regenerated with ease by slurrying in water and acidifying to a pH of about 1 with hydrochloric acid to form purified demethylchlortetracycline hydrochloride. This isolation procedure is of particular advantage in that highly purified demethylchlortetracycline results which is free of epimeric forms.

The invention will be described in greater detail in conjunction with the following specific examples.

EXAMPLE 1

*Recovery of 7-Chloro-6-Demethyltetracycline Neutral*

Two kilograms of a demethylchlortetracycline containing fermentation mash was adjusted to pH 1.8 by the addition of sulfuric acid. A 150-gram quantity of Hyflo Super-Cel (a diatomaceous earth filter aid) was added and the mixture stirred for 30 minutes before filtration. The filter cake was reextracted with hot water at a pH of 1.7 and filtered. These two acid filtrates were combined and the combined acid filtrate treated with 3.19 grams of ammonium oxalate, stirred for 30 minutes, and filtered. To 2660 milliliters of this aqueous filtrate was added 319 milliliters of methyl isobutyl ketone and 12 milliliters of 50% cetyltrimethyl-ammonium chloride (Arquad 16) in isopropanol. The mixture was adjusted to pH 10.0 with sodium hydroxide, stirred for 30 minutes, then the aqueous and organic phases were allowed to separate. Most of the water phase was removed. The remaining 2-phase mixture was filtered using Hyflo Super-Cel and the filtrate saved. The filter cake was washed with 70 milliliters of methyl isobutyl ketone, then the wash and saved filtrate combined. The solvent phase was removed and washed with 45 milliliters of water at pH 10. The wash water was separated and discarded. The solvent phase was extracted twice; first with 70 milliliters of water at pH 2 and then with 35 milliliters of water at a similar pH. These two back-water extracts were combined, 3-grams of tetrasodium salt of ethylene-diamine-tetraacetic acid (Versene) was added and the pH was adjusted to 6 with dilute sodium hydroxide solution to precipitate demethylchlortetracycline neutral in crystalline form. The yield from mash of demethylchlortetracycline was 40%.

EXAMPLE 2

Recovery of 7-Chloro-6-Demethyltetracycline Hydrochloride

To 13 liters of mash containing demethylchlortetracycline was added 1500 grams of Hyflo Super-Cel. The mixture was adjusted to a pH of 1.3 with sulfuric acid, stirred, and filtered. The filtrate was saved and the filter cake reextracted with hot water at a pH of 1.3, then filtered and the filtrate saved. The two acid filtrates were combined and to the 22 liters of combined acid filtrate were added 300 grams of ammonium oxalate. The pH of the mixture was adjusted to 1.8 and the mixture was subsequently stirred and filtered. To the aqueous filtrate was added 1600 milliliters of methyl isobutyl ketone, 51 milliliters of 50% cetyltrimethylammonium chloride (Arquad 16) and the pH adjusted to 9.3 with 375 milliliters of 18 N sodium hydroxide solution.

The mixture was stirred and filtered and the filtrate saved. The filter cake was washed with 100 milliliters of methyl isobutyl ketone which was then combined with the filtrate. To 1260 milliliters of the solvent phase was added 150 milliliters of water. The mixture was acidified with 5.5 milliliters of 12 N hydrochloric acid and stirred. The aqueous extract was separated from the solvent phase. To the 173 milliliters of back-water extract were added 82 milliliters of n-butanol and 17.4 grams of sodium chloride. The mixture was stirred before the aqueous and organic solvent phases were separated. The 99 milliliters of n-butanol extract was concentrated to 60 milliliters in vacuo at 30° C.–35° C. A 15-milliliter portion of 2-ethoxyethanol was added, the pH adjusted to 1.0 with 2.1 milliliters of concentrated hydrochloric acid and the mixture seeded and aged. The crystals which formed were filtered off and washed first with 15 milliliters of a 1:3 mixture of 2-ethoxyethanol and n-butanol and then with 15 milliliters of ether. The washed crystals were vacuum-dried at 40° C.; resulting in 6.21 grams of a product assaying 921 mcg./mg. and representing a yield from the mash of 31.2%.

EXAMPLE 3

Recovery of 7-Chloro-6-Demethyltetracycline Hydrochloride

A 4-kilogram quantity of a fermentation mash containing demethylchlortetracycline assaying 1540 mcg./ml. was adjusted to pH 1.3 with 130 milliliters of 25% sulfuric acid solution, stirred for 30 minutes and filtered, using 100 grams of Hyflo Super-Cel. The filtrate was saved. The filter cake was reslurried with 2 liters of water at 50° C., acidified to pH 1.5, using 25% sulfuric acid solution, stirred for 30 minutes and filtered. The filtrates were combined to give 5600 milliliters of a combined acid filtrate. An 1870 milliliter quantity of acid filtrate (equivalent to one-third of the total batch) was removed and decalcified as follows: 26.7 grams of oxalic acid was added to the acid filtrate aliquot and the mixture was stirred until the oxalic acid was completely dissolved. The pH was then adjusted to 2.0 with 25% sodium hydroxide solution and the mixture allowed to stand at room temperature (25°±5° C.) for one hour to permit precipitation of calcium oxalate. The calcium oxalate precipitate was removed by filtration, giving 1980 milliliters of decalcified combined acid filtrate. A 990-milliliter aliquot of this filtrate was processed to demethylchlortetracycline hydrochloride as follows: A 5.2-milliliter quantity of Arquad 16 (33%, aqueous) was added to the 990-milliliters of the filtrate. In addition, 100 milliliters of methyl isobutyl ketone were also added to the filtrate. The pH of the mixture was adjusted to 9.5 with 25% sodium hydroxide solution. The mixture was stirred for 30 minutes, then filtered, and the filtrate allowed to stand for 30 minutes to separate the two phases. The solvent phase was removed by decantation and mixed with 7 milliliters of water. The pH of this bi-phase system was adjusted to 0.5 with 1.2 milliliters of concentrated hydrochloric acid. After ageing for 19.5 hours on a shaker, the crystals which formed were removed by filtration and washed successively with methyl isobutyl ketone and chloroform. The washed crystals were then dried in vacuo at 60° C. for 5 hours. A 0.595-gram quantity of demethylchlortetracycline hydrochloride, assaying 991 mcg./mg. and having an $E^{1\%}_{1\,cm.}$ at 460 m$\mu$ of 0.645 was obtained. The yield was 57.5%.

EXAMPLE 4

Four separate 1400-liter batches of demethylchlortetracycline containing mash were adjusted to pH 1.0 with 25% sulfuric acid and 2% w./v. of Hyflo filter aid was added. The mash was agitated for 30 minutes and was then filtered on a pre-coated rotary vacuum filter. The acid mash filtrate was collected and the cake was reslurried in 50% v./v. of water at room temperature (25°±5° C.). The pH of the slurry was adjusted to 1.0 with 25% sulfuric acid and mixed for 30 minutes. The slurry was heated to 60° C. and was then filtered on the same pre-coated filter. The reslurry filtrate was cooled to room temperature and combined with the acid mash filtrate for extraction. The spent cake was discarded. Oxalic acid, 2% w./v. of original mash, was added to the combined acid filtrate and the pH was adjusted to 1.5 with 50% NaOH solution. The batch was then agitated for 30 minutes to complete the precipitation of calcium oxalate. Arquad 16 (33% water solution) was added to the oxalated combined acid filtrate at a level of 4.8 ml./gm. of demethylchlortetracycline in the mash and methyl isobutyl ketone, 10% v./v. of combined acid filtrate was added to the extraction tank. The pH was adjusted to 9.0–9.5 with 50% NaOH solution and the batch was agitated for 30 minutes to facilitate extraction into the solvent phase. The methyl isobutyl ketone extract was separated from the extraction centrifuge and collected for further processing. The spent combined acid filtrate and sludge were discarded. A 10% v./v. of tap water was added to the methyl isobutyl ketone extract and the pH was adjusted to 0.8–1.0 with concentrated hydrochloric acid and aged for about 15 hours at this pH with constant agitation at room temperature. After ageing was completed, the crystals were filtered from the two-phase mother liquor. The crude demethylchlortetracycline hydrochloride was displacement-washed twice with 1% of mash volume of methyl isobutyl ketone. All filtrate streams were sent to solvent recovery and the crystals were dried in vacuo at 50° C. for about 16 hours before weighing and sampling for assay. Test results are shown in Table 1 below:

Four other separate 1400-liter batches (Nos. 5, 6, 7, 8) of demethylchlortetracycline containing mash were processed as above with the exception that 28% NH$_4$OH solution was used as the extraction step base in place of 50% NaOH solution. Test results are shown in Table 1. below:

TABLE 1

NH₄OH vs. NaOH

| Batch No. | Mash Potency, mcg./ml. | Crude, percent | Demethyl-chlortetra-cycline, mcg./mg. | Demethyl-tetra-cycline, mcg./mg. | Assay | | $E_{1\,cm.}^{1\%}$ at 460 m$\mu$ |
|---|---|---|---|---|---|---|---|
| | | | | | Spectro-photo-metric, percent | Micro-biolo-gical percent | |
| 1 | 1,270 | 44.8 | 979 | 58 | 1,010 | 1,053 | 0.28 |
| 2 | 1,340 | 41.4 | 890 | 139 | 1,014 | 861 | 0.41 |
| 3 | 1,230 | 41.6 | 835 | 102 | 911 | 855 | 0.60 |
| 4 | 1,790 | 43.5 | 889 | 52 | 942 | 895 | 0.34 |
| Avg | 1,407 | 42.8 | 898 | 88 | 969 | 916 | 0.41 |
| 5 | 1,310 | 58.0 | 910 | 90 | 977 | 891 | 0.26 |
| 6 | 1,200 | 61.8 | 900 | 120 | 983 | 1,001 | 0.24 |
| 7 | 820 | 71.7 | 914 | 125 | 1,007 | 1,039 | 0.25 |
| 8 | 790 | 65.5 | 909 | 82 | 1,039 | 981 | 0.23 |
| Avg | 1,030 | 64.3 | 908 | 104 | 1,002 | 978 | 0.25 |

It will be noted from the above data that both in yield of crude and in color of the final product, the NH₄OH process is superior to the NaOH process.

We claim:

1. The process of extracting demethylchlortetracycline from a fermentation mash containing the same which comprises acidifying the mash to a pH of between about 0.5–2.5 with a mineral acid so as to solubilize the demethylchlortetracycline contained therein, filtering the mash, contacting the acid filtrate with from 0.5 to 3% by volume of a compound of the group consisting of oxalic acid and ammonium oxalate so as to precipitate excess calcium ions, adding to the decalcified acid filtrate from about 0.5 mole to about 3 moles per mole of demethylchlortetracycline of a quaternary ammonium compound selected from the group consisting of long chain alkyl trimethylammonium chlorides and dialkyldimethylammonium chlorides as to form a demethylchlortetracycline-quaternary ammonium complex, raising the pH of the acid filtrate to between about 8 and 12 with an alkali, contacting the acid filtrate with a methyl alkyl ketone solvent so as to extract the demethylchlortetracycline therefrom, separating the solvent extract, and thereafter isolating the demethylchlortetracycline from the solvent extract.

2. The process according to claim 1 in which the quaternary ammonium compound is cetyltrimethylammonium chloride.

3. The process according to claim 1 in which the solvent is methyl isobutyl ketone.

4. The process according to claim 3 in which the methyl isobutyl ketone is used in a quantity ranging from about 5% to about 50% by volume based on the acid filtrate.

5. The process according to claim 4 in which the alkali is ammonium hydroxide.

6. The process according to claim 5 in which the demethylchlortetracycline is isolated from the methyl isobutyl ketone extract by adding a saturated aqueous urea solution thereto, adjusting the pH to a pH of about 1 by the addition of sulfuric acid so as to form a demethylchlortetracycline-urea-sulfate complex and regenerating pure demethylchlortetracycline by slurrying in water and adjusting the pH to about 1 with hydrochloric acid whereupon crystallization of the demethylchlortetracycline as the hydrochloride occurs, and thereafter recovering the demethylchlortetracycline hydrochloride.

References Cited in the file of this patent

UNITED STATES PATENTS

| 2,873,276 | Blase | Feb. 10, 1959 |
| 2,875,247 | Fox et al. | Feb. 24, 1959 |
| 2,905,662 | Smith et al. | Sept. 22, 1959 |

FOREIGN PATENTS

| 769,239 | Great Britain | Mar. 6, 1957 |
| 821,310 | Great Britain | Oct. 7, 1959 |